United States Patent Office 3,227,678
Patented Jan. 4, 1966

3,227,678
POLYPROPYLENE COMPOSITIONS STABILIZED WITH 4,4' METHYLENE BIS 2,6 DIALKYL PHENOLS
Marvin P. Weaver, Princeton, N.J., assignor to Union Carbide Corporation, a corporation of New York
No Drawing. Filed Feb. 12, 1959, Ser. No. 792,694
8 Claims. (Cl. 260—45.95)

The present invention relates to polypropylene compositions and more particularly to polypropylene compositions which are stabilized against thermal degradation.

Polypropylene is superior to polyethylene in many respects. For example, it possesses greater resistance to stress cracking, easier processability, lower density, better clarity, dimensional stability at higher temperatures and comparable electrical properties. Polypropylene, however, is extremely susceptible to thermal degradation and cannot even withstand ordinary hot compounding and forming operations without its physical properties being so severely reduced as to render it unacceptable for most commercial applications. In general, temperatures of the order of 170° C. to 180° C. are employed for fluxing polypropylene and temperatures of the order of 220° C. to 250° C. for extruding polypropylene.

Attempts have been made to overcome this deficiency in polypropylene by adding thereto stabilizers which were known to improve the thermal stability of polyethylene. These attempts have proved unsuccessful, however. It has been relegated, therefore, to a secondary role while polyethylene occupies a position of preeminence in the plastics art.

The requirements of a polypropylene stabilizer differ so greatly from those of a polyethylene stabilizer that even the most effective polyethylene stabilizers were of no value for polypropylene. For example, an unsubstituted bisphenol or 2,6-di-tert-butyl-p-cresol, which are widely used as stabilizers for polyethylene, do not stabilize polypropylene and, in fact, aggravate its thermal instability, almost doubling the amount of molecular degradation suffered during roll-milling. Examples of other stabilizers which are effective for polyethylene and ineffective for polypropylene are thiobisphenols, such as 2,2'-thio bis(4-methyl-6-tert-butyl-phenol) and 4,4'-thio bis(6-tert-butyl-m-cresol). It is evident, therefore, that the efficacy of a stabilizer for polypropylene cannot be predicted from its efficacy for polyethylene and that attempts to employ the known polyethylene stabilizers in polypropylene have generally resulted in failure. Hence, it has been necessary to discover new stabilizers for polypropylene.

There is a great need in the plastics art for a polypropylene composition that is stabilized against thermal degradation. It is the primary object of the present invention to provide such a composition.

It is another object of the present invention to provide a polypropylene composition having improved resistance to oxidation so that it can be processed on conventional equipment and become commercially useful.

It is another object of the present invention to provide compounds that will stabilize polypropylene compositions against thermal degradation.

These and other objects are accomplished according to the present invention, in which a stabilized polypropylene composition has present therein a stabilizing amount of a compound having the formula

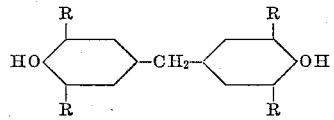

wherein R is a lower alkyl group, which may be primary, secondary or tertiary, and may be the same or different. By "lower alkyl group" is meant an alkyl radical having from 1 to 6 carbon atoms.

Examples of specific polyphenols within the scope of the above formula and useful in the practice of this invention are the following:

4,4'-methylene-bis(2,6-dimethyl phenol)
4,4'-methylene-bis(2-methyl-6-isopropyl phenol)
4,4'-methylene-bis(2,6-diisopropyl phenol)
4,4'-methylene-bis(2-methyl-6-tertiarybutyl phenol)
4,4'-methylene-bis(2,6-ditertiarybutyl phenol)
4,4'-methylene-bis(2-methyl-6-tertiaryamyl phenol)
D,4'-methylene-bis(2,6-ditertiaryamyl phenol)
4,4'-methylene-bis(2-methyl-6-hexyl phenol)
4,4'-methylene-bis(2,6-dihexyl phenol)
4,4'-methylene-bis(2-isopropyl-6-tertiarybutyl phenol)
4,4'-methylene-bis(2-isopropyl-6-tertiaryamyl phenol)
4,4'-methylene-bis(2-tertiarybutyl-6-tertiaryamyl phenol)
3,5-dimethyl-3',5'-diethyl-4,4'-dihydroxy-diphenyl methane
3,5-diethyl-3',5'-ditertiarybutyl-4,4'-dihydroxy-diphenyl methane
3,5-diisopropyl-3',5'-dihexyl-4,4'-dihydroxy-diphenyl methane
3,5-ditertiarybutyl-3',5'-ditertiaryamyl-4,4'-dihydroxy-diphenyl methane
3,3'-methyl-5-ethyl-5'-isopropyl-4,4'-dihydroxy-diphenyl methane
3-methyl-5-isopropyl-3'-ethyl-5'-tertiarybutyl-4,4'-dihydroxy-diphenyl methane
3-isopropyl-5-hexyl-3'-tertiarybutyl-5'-tertiaryamyl-4,4'-dihydroxy-diphenyl methane.

It is preferable that at least one of the R groups on each phenol ring be a methyl radical. Particularly preferred compounds are 4,4'-methylene-bis(2-methyl-6-tertiarybutyl phenol) and 4,4'-methylene-bis(2,6-dimethyl phenol).

The propylene polymers which are effectively stabilized in accordance with the present invention are those which are normally solid at room temperature and may be produced according to any of the several methods known in the art. Exemplary of such processes are those described in Australian patent application No. 6,365/55 to Phillips Petroleum Company, United States Patent No. 2,692,259 to Edwin F. Peters, and United States Patent No. 2,791,576 to Edmund Field.

The appropriate concentration of stabilizer in the composition depends on, among other things, the particular stabilizer and polypropylene resin involved; the severity of the thermal conditions to which the composition is to be subjected during compounding, forming and use; the nature and amount of other modifiers included in the composition; etc. In general, concentrations as low as 0.005% or 0.01% by weight of stabilizer based on the weight of polypropylene effect significant stabilization, and concentrations exceeding about 2% by weight do not add any beneficial advantages. In general, a concentration of about 0.05% by weight of stabilizer based on the weight of polypropylene is preferred.

In corporation of the stabilizing material in the polymeric propylene is accomplished by conventional methods using such apparatus as a roll mill, Banbury mixer, or the like. Advantageously the polypropylene is mechanically worked at a temperature only just sufficiently high, i.e., about 170 to 180° C., to attain a fluxed material of formable consistency before the stabilizer is added. This procedure permits a minimum of processing to obtain an intimate mixture of the composition constituents.

It is understood that various other additives which do not impair the stabilizing action of the stabilizers of this invention may be incorporated into the composition in the conventional manner. Such additives include colorants, light stabilizers, fillers, pigments, processing aids, slip agents, lubricants, corrosion inhibitors, and the like.

Polypropylene compositions containing the stabilizers of the present invention resist oxidation by an oxygen atmosphere at 140° C. for a period approximately ten times as long as does the unmodified polypropylene. They can also withstand the mechanical and thermal abuse inflicted by 45 minutes of roll-milling at 170° C. with virtually no molecular degradation.

A series of tests were conducted to illustrate the improved resistance to oxidation of polypropylene compositions containing the stabilizers of the present invention over unmodified polypropylene and polypropylene containing two well known stabilizers for polyethylene. The results of these tests are shown in Table I. The tests were conducted as follows:

Polypropylene (melt index 0.70, density 0.90 g./cc., ash content 0.06%, dielectric constant 2.27) was fluxed and sheeted on a two-roll mill at 170° C. Then, 0.05% by weight of the modifier was added to the sheet, on the mill, and thoroughly mixed therewith by successively removing the sheet from the rolls and end-passing it through the mill nip four times.

A representative sample of the roll sheet was removed and the melt index of the composition was carefully measured. The remainder of the material was left on the mill and milling was continued at 170° C. After 10 minutes, a sample was withdrawn for use in the oxygen bomb test. The remainder was milled an additional 35 minutes, then removed and its melt index measured. The increase in melt index effected by this 45 minute milling treatment appears in Table I.

The "induction period" was determined in the following manner. A mixture consisting of 0.2 g. of the composition which had been milled 10 minutes at 170° C. and 2.0 g. CaO was charged to a Norma-Hoffman bomb (similar to that described in ASTM D–942–50 for determining stability of lubricating greases) equipped with an automatic pressure recorder and maintained at 140° C. under oxygen (at an initial pressure of 20 p.s.i.) for 24 hours. The time vs. oxygen pressure curve was then examined and the induction period, i.e., the time at which the oxygen pressure began to drop, was determined.

*Table I*

| Modifier (0.05%) | Induction period, hrs., in oxygen bomb at 140° C. | Increase in melt index effected by milling 45 min. on 2-roll mill at 170° C. |
|---|---|---|
| (A) none (control) | 1.75 | 27 |
| (B) 2,6-ditertiarybutyl-p-cresol | 0.75 | >48 |
| (C) 4,4'-dihydroxydiphenylmethane | 2.0 | >46 |
| (D) 4,4'-methylene-bis(2-methyl-6-tertiarybutyl phenol) | 21 | 0.23 |
| (E) 4,4'-methylene-bis(2,6-dimethyl phenol) | 19 | 0.12 |

It can be seen from Table I that:

(1) The unmodified polypropylene (A) starts to react rapidly with oxygen at 140° C. after only 1.75 hours; and its melt index is severely increased, i.e., a great deal of molecular degradation takes place, when it is roll-milled at 170° C.;

(2) The stabilizers of the present invention, (D) and (E), effect about a twelve-fold increase in the induction period, i.e., the time during which there is little to no reaction between the polypropylene and oxygen, at 140° C.; and they enable the resin to sustain the thermal and mechanical abuse inflicted thereon by 45 minutes of roll-milling at 170° C. with virtually no molecular degradation;

(3) Other polyphenols, as exemplified by 4,4'-dihydroxy-diphenylmethane, (Example C), have no significant effect on the induction period, and they almost double the magnitude of the melt index increase suffered during roll-milling; and (4) 2,6-ditertiarybutyl-p-cresol (Example B), a well known phenolic antioxidant widely used to stabilize polyethylene, reduces the induction period, i.e., hastens the oxidation of polypropylene and it, too, almost doubles the extent of the molecular degradation suffered during roll-milling.

What I claim is:

1. A normally solid polypropylene composition stabilized toward oxidation and thermal degradation, having present therein from about 0.01% to 2% by weight based on the weight of polypropylene of a compound having the formula

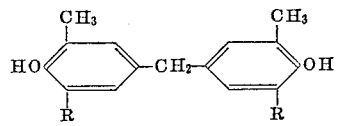

wherein R is an alkyl radical having 1 to 6 carbon atoms inclusive.

2. A normally solid polypropylene composition containing an amount of 4,4'-methylene-bis(2-methyl-6-tert. butyl phenol) sufficient to stabilize the composition toward oxidation and thermal degradation.

3. A normally solid polypropylene composition stabilized toward oxidation and thermal degradation, having present therein about 0.05% by weight based on the weight of polypropylene of a compound having the formula

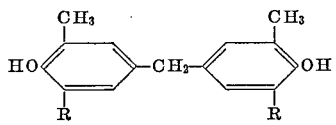

wherein R is an alkyl radical having 1 to 6 carbon atoms inclusive.

4. A normally solid polypropylene composition stabilized toward oxidation and thermal degradation, having present therein from about 0.01% to 2% by weight based on the weight of polypropylene of 4,4'-methylene-bis(2-methyl-6-tertiary-butyl phenol).

5. A normally solid polypropylene composition stabilized toward oxidation and thermal degradation, having present therein about 0.05% by weight based on the weight of polypropylene of 4,4'-methylene-bis(2-methyl-6-tertiary-butyl phenol).

6. A normally solid polypropylene composition stabilized toward oxidation and thermal degradation, having present therein from about 0.01% to 2% by weight based on the weight of polypropylene of 4,4'-methylene-bis(2,6-dimethyl phenol).

7. A normally solid polypropylene composition stabilized toward oxidation and thermal degradation, having present therein about 0.05% by weight based on the weight of polypropylene of 4,4'-methylene-bis(2,6-dimethyl phenol).

8. A normally solid polypropylene composition containing an amount of 4,4'-methylene bis(dialkyl phenol) wherein one alkyl radical is methyl and the other alkyl radical has from 1 to 6 carbon atoms inclusive, sufficient to stabilize the composition toward oxidation and thermal degradation.

References Cited by the Examiner

UNITED STATES PATENTS

| | | | |
|---|---|---|---|
| 2,807,653 | 9/1957 | Filbey et al. | 260—619 |
| 2,820,775 | 1/1958 | Chamberlain et al. | 260—45.95 |
| 2,834,768 | 5/1958 | Friedlander | 260—45.95 |
| 2,940,949 | 6/1960 | Mullin | 260—45.95 |
| 2,957,849 | 10/1960 | Kennedy | 260—45.95 |
| 2,985,617 | 5/1961 | Salyer et al. | 260—45.95 |

FOREIGN PATENTS 777,538   6/1957   Great Britain.

LEON J. BERCOVITZ, *Primary Examiner.*

A. M. BOETTCHER, A. D. SULLIVAN, MILTON STERMAN, *Examiners.*